D. B. DAVIES AND E. P. STRONG.
PROCESS AND APPARATUS FOR PREPARING SULPHITE DIGESTION LIQUOR.
APPLICATION FILED JUNE 1, 1920.
1,424,883.
Patented Aug. 8, 1922.
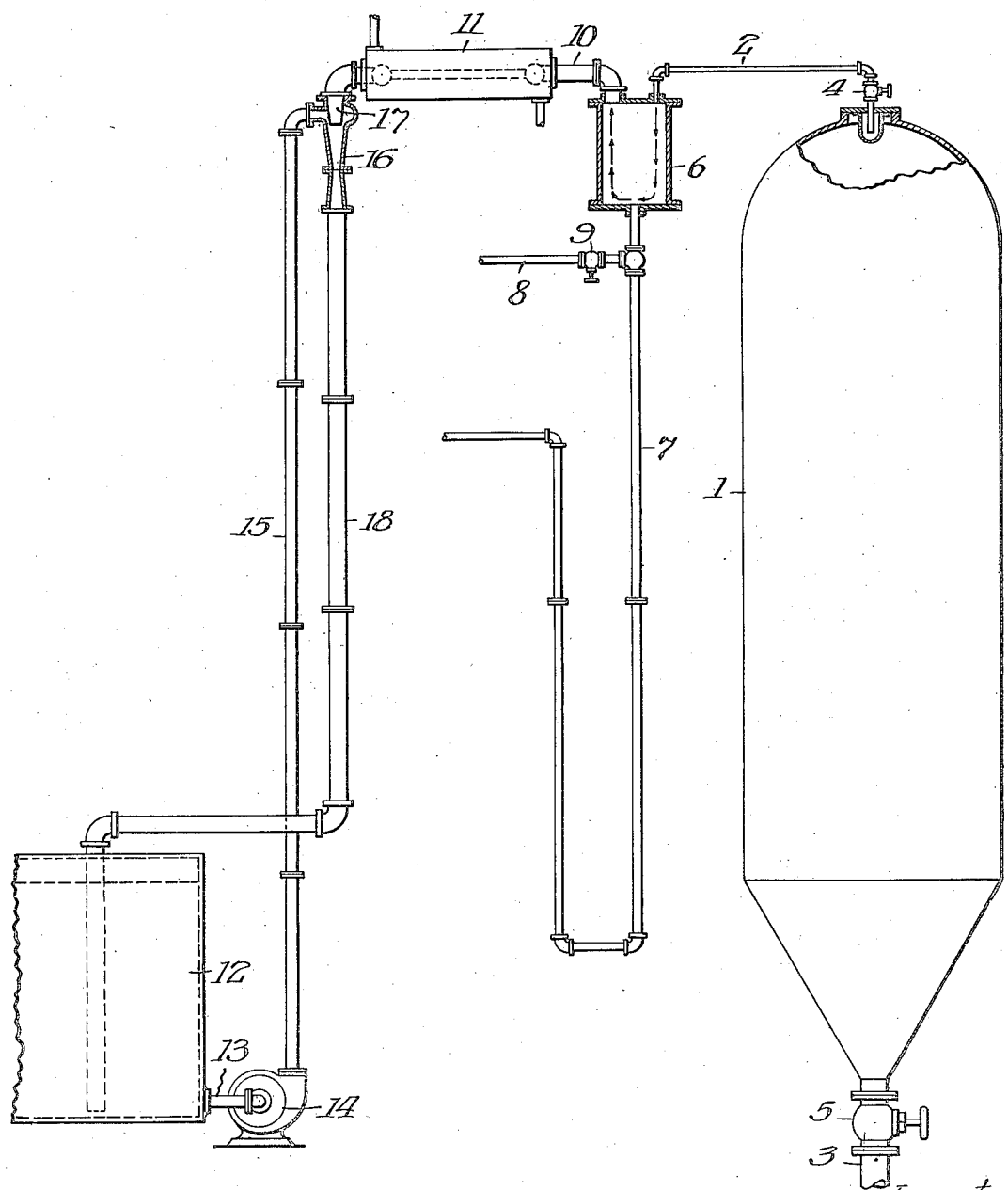

UNITED STATES PATENT OFFICE.

DAVID B. DAVIES AND EDWARD P. STRONG, OF MUNISING, MICHIGAN.

PROCESS AND APPARATUS FOR PREPARING SULPHITE DIGESTION LIQUOR.

1,424,883.  Specification of Letters Patent.  Patented Aug. 8, 1922.

Application filed June 1, 1920. Serial No. 385,703.

*To all whom it may concern:*

Be it known that we, DAVID B. DAVIES and EDWARD P. STRONG, both of Munising, county of Alger, and State of Michigan, have invented certain new and useful Processes and Apparatus for Preparing Sulphite Digestion Liquor, of which the following is a specification.

The invention relates to the sulphite digestion of fibrous material and seeks to provide an improved method and apparatus for preparing the sulphite liquor and for recovering the sulfurous acid gas relieved from the digester.

For the manufacture of cellulose from woody or other fibrous material by the sulphite method, so called "raw acid" is usually first prepared by treating lime water with sulfurous acid gas. This "raw" liquor ordinarily contains about the proper amount of "combined" sulfurous acid but less than the amount of "free" acid required in the finished or so called "cooking acid." The finished digestion liquor is prepared by the introduction into the raw liquor of gas relieved from the digester or cooking vessel and which usually contains about 95 to 98 per cent of sulfurous acid. The method now generally employed is to relieve the gas from the digester under pressure and, after passing the gas through suitable separating and cooling means, it is injected through submerged pipes into the sulphite liquor. The latter absorbs part of the gas and the proportion of free acid in the liquor is increased. Any unabsorbed gas is returned to the plant for the preparation of raw acid.

With this method, the gas in the relief system is necessarily under considerable pressure since it must overcome the hydrostatic head in the tank containing the sulphite liquor into which the gas is injected, and this pressure interferes with the complete separation of the gas from the waste liquor and condensed water vapor in the relief system. Again the injection of the gas agitates the liquor in the tank so that a considerable portion of the gas passes off unabsorbed and it is difficult to retain in the liquor the desired high proportion of free sulfurous acid.

In accordance with the present improved method, the liquor to be charged with the sulfurous acid gas, is circulated through an aspirator and thence through a long, preferably vertical pipe extending downwardly from the aspirator and opening into the lower portion of a storage tank. The gas relieved from the digester after passing through suitable separating and cooling means to remove waste liquor therefrom and lower its temperature, is conducted to the aspirator and is drawn thereby into the confined current of sulphite liquor. Because of the practical purity of the sulfurous acid gas and since, by the operation of the aspirator, it is intimately mixed with the confined current of liquid, a rapid and practically complete absorption of the gas is effected and the gas can be relieved from the digester under less than atmospheric pressure into vacuum produced in the entire system between the aspirator and the digester relief pipe.

On this account, there is a much more complete separation of the sulfur dioxide gas from the waste liquor and condensed water vapor in the relief system than is the case where the gas is relieved from the digester against pressure in the separator. Again practically all of the sulfurous acid gas is absorbed by the liquor before the latter enters the storage tank so that there is little agitation or bubbling in the tank. As a result, a more perfect retention of the gas is effected and the "free" sulfurous acid in the liquid under treatment is more readily increased or built up to the desired relatively high percentage than is the case with other methods now employed.

The accompanying drawing illustrates diagrammatically an improved apparatus for carrying out the described process.

The digester or cooking vessel one, in which charges of wood chips or other fibrous material are treated with digestion liquor is of usual construction, and has relief and blow-off pipes 2 and 3 that are connected respectively to its upper and lower ends and provided with valves 4 and 5. During each digesting operation, gas, water vapor, and some waste liquor are passed off from the digester through the relief pipe and, finally the waste liquor and cooked fiber are discharged through the pipe 3. The relief pipe 2 leads to the upper portion of a suitable separator 6 in which some of the water vapor and the greater portion of the waste liquor carried off by the gas are separated and which is provided as usual with a waste liquor trap 7. To prevent ebullition in the trap and safely seal the same, suitable cooling means, such as a cold water supply pipe 8 having a controlling valve 9, is provided. From the upper portion of the separator the gas is conducted by a pipe 10 through a suitable cooler 11.

A storage tank 12, for receiving the sulphite liquor from the raw acid plant is connected by a pipe 13 to a centrifugal pump 14. The latter withdraws the liquor from the tank and forces it through an upwardly extending pipe 15 that is connected to the annular chamber of an aspirator 16. The gas supply pipe 11 is connected to the aspirator nozzle 17 and a return pipe 18 extends downwardly from the aspirator and opens into the storage tank 12 at a point near the bottom thereof. The usual pipes (not shown) are provided for conducting liquor from the raw acid plant to the tank 12, for returning any gas escaping from the liquor in the tank to the acid plant, and for conducting the finished cooking acid from the tank to the digester.

As the gas is relieved from the cooking vessel during each digestion operation, the pump 14 is actuated to withdraw liquor from the tank 12 and circulate it through the pipe 15, aspirator 16 and return pipe 18 back to the tank. The highly concentrated sulfur dioxide gas is drawn into the confined current of circulating liquor and is rapidly absorbed thereby so that the relieved gases can be maintained under good vacuum to effectively separate the sulfur dioxide gas from the relief waste liquor and condensed water vapor. As stated the absorption of the sulfur dioxide is practically complete before the liquor is returned to the tank. For this reason and since there is no appreciable quantity of other gases, there is little agitation or bubbling in the tank to prevent the retention of a high proportion of free sulfur dioxide. With the improved process and apparatus, it is believed that the separation of the gas from the relief waste liquor and condensed water vapor and its absorption by the fresh digestion liquor are much more complete and rapid than with other methods and apparatus heretofore employed.

The details set forth of the improved process and apparatus for the preparation of sulphite digestion liquid can be varied, and portions thereof adopted without departure from the essentials of the invention as defined in the claims.

We claim as our invention:

1. The process of preparing sulphite digestion liquor, which consists in withdrawing the liquor from a storage tank, circulating the same in a confined current and returning it to the tank at a point below the surface of the liquor therein, and aspirating sulfurous acid gas into the circulating current of liquor to effect the absorption of the gas thereby.

2. In the sulphite digestion of fibrous material, the process of circulating sulphite liquor in a confined current and recovering the concentrated sulfurous acid gas relieved from the digester by aspirating the same into the circulating current of liquor to effect the absorption of the gas thereby.

3. In the sulphite digestion of fibrous material, the process of recovering the sulfurous acid gas relieved from the digester, which consists in separating waste liquor and water vapor from the gas, cooling the gas, and then, by aid of a confined current of sulphite liquor, aspirating the gas into the liquor to effect the absorption of the gas thereby.

4. In the sulphite digestion of fibrous material, the process of preparing cooking liquor and recovering the concentrated sulfurous acid gas, relieved from the digester, which consists in withdrawing the liquor from a suitable storage tank, circulating the same in a confined current and returning it to the tank at a point below the level of the liquid therein, separating waste liquor from the gas and cooling the same, and then by means of the current of liquor, aspirating the gas into the liquor and thereby effecting the absorption of the gas.

5. In the sulphite digestion of fibrous material, the process which consists in relieving the gas from the digester and aspirating the same into a confined current of sulphite liquor to thereby maintain the relieved gas under less than atmospheric pressure and effect the absorption thereof by the liquor.

6. An apparatus for preparing sulphite digestion liquor comprising a storage tank for the sulphite liquor, a pump and pipe connection for withdrawing the liquor from said tank, circulating the same in a confined current and returning it to the tank at a point near the bottom thereof, a supply pipe for sulfurous acid gas and an aspirator interposed in said pipe connections arranged to draw the gas from said supply pipe into the circulating current of liquid and thereby effect the absorption of the gas, substantially as described.

7. In a sulphite digesting apparatus, a digester, a gas relief pipe for said digester, means for separating waste liquor from the gas passing through said pipe and for cooling the same, an aspirator connected to said pipe, a storage tank for sulphite liquor and a pump and pipe connection for circulating the liquor through said aspirator and into said tank at a point below the level of the liquid therein, whereby the gas is drawn by suction into the liquid and is absorbed thereby, substantially as described.

8. In a sulphite digesting apparatus, a digester, a storage tank for sulphite liquor, a pump for withdrawing liquor from said tank, a vertical delivery pipe for said pump, an aspirator connected to said pipe, a vertical return pipe leading from said aspirator and opening into said tank at a point near the bottom thereof, pipe connections for delivering sulfurous acid gas relieved from said digester to said aspirator and means for separating waste liquor from the gas passing through said pipe connections and for cooling the same, whereby the gas is drawn by suction into the liquor and is absorbed thereby, substantially as described.

DAVID B. DAVIES.
EDWARD P. STRONG.